United States Patent
Yu et al.

(10) Patent No.: US 10,604,702 B2
(45) Date of Patent: Mar. 31, 2020

(54) SEQUENTIAL TREATMENT WITH AQUEOUS SULFONATED AROMATIC POLYMER AND AQUEOUS POLYETHYLENE OXIDE FOR ENHANCED WATER RETENTION

(71) Applicant: Dow Global Technologies LLC, Midland, MI (US)

(72) Inventors: Wanglin Yu, Freeport, TX (US); Michael J. Radler, Midland, MI (US); Sung-Yu Ku, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 119 days.

(21) Appl. No.: 15/737,371

(22) PCT Filed: Jun. 23, 2016

(86) PCT No.: PCT/US2016/038975
§ 371 (c)(1),
(2) Date: Dec. 18, 2017

(87) PCT Pub. No.: WO2016/210100
PCT Pub. Date: Dec. 29, 2016

(65) Prior Publication Data
US 2018/0195001 A1    Jul. 12, 2018

Related U.S. Application Data

(60) Provisional application No. 62/185,217, filed on Jun. 26, 2015.

(51) Int. Cl.
| | | |
|---|---|---|
| C09K 17/26 | (2006.01) |
| C09K 17/32 | (2006.01) |
| C09K 17/14 | (2006.01) |
| C05G 3/80 | (2020.01) |
| C08G 10/04 | (2006.01) |
| C08L 71/02 | (2006.01) |

(52) U.S. Cl.
CPC ............... *C09K 17/26* (2013.01); *C05G 3/80* (2020.02); *C08G 10/04* (2013.01); *C08L 71/02* (2013.01); *C09K 17/14* (2013.01); *C09K 17/32* (2013.01)

(58) Field of Classification Search
CPC ........ C09K 17/26; C09K 17/32; C09K 17/14; C09K 3/22; C09K 3/18; C08L 71/02; C08G 10/04; C05G 3/04; C05G 3/0076; C05C 1/00; C05C 9/00
See application file for complete search history.

(56) References Cited

U.S. PATENT DOCUMENTS

| | | |
|---|---|---|
| 5,494,516 A | 2/1996 | Drs et al. |
| 5,501,720 A | 3/1996 | Buchholz |
| 6,802,673 B1 | 10/2004 | Ellenberger |
| 2004/0069032 A1 | 4/2004 | Krysiak et al. |
| 2005/0022570 A1 | 2/2005 | Duarte-Macdonald |
| 2008/0254983 A1 | 10/2008 | Panayi et al. |

FOREIGN PATENT DOCUMENTS

| | | |
|---|---|---|
| CA | 2194205 | 6/1998 |

OTHER PUBLICATIONS

Hacker, M. C., and A. G. Mikos. "Synthetic Polymers." Foundations of Regenerative Medicine: Clinical and Therapeutic Applications (2009): 336.*
Muntohar, Agus Setyo, and Roslan Hashim. "Determination of plastic limits of soils using cone penetrometer: Re-Appraisal." Jurnal (2005).*
International Search Report & Written Opinion for related PCT Application PCT/US2016/038975, dated Sep. 19, 2016 (12 pgs).
International Preliminary Report on Patentability for related PCT Application PCT/US2016/038975, dated May 24, 2017 (12 pgs).
J. Pickelmann and J. Plank, "A mechanistic study explaining the synergistic viscosity increase obtained from polyethylene oxide (PEO) and β-naphthalene sulfonate (BNS) in shotcrete", Cement and Concrete Research 42, 1409-1416 (2012).

* cited by examiner

*Primary Examiner* — Jennifer A Smith
(74) *Attorney, Agent, or Firm* — Brooks, Cameron & Huebsch, PLLC

(57) ABSTRACT

Treat an aggregation of particulates with two different aqueous mixtures, first with an aqueous mixture containing a sulfonated aromatic polymer component and then with an aqueous mixture containing polyethylene oxide.

9 Claims, No Drawings

SEQUENTIAL TREATMENT WITH AQUEOUS SULFONATED AROMATIC POLYMER AND AQUEOUS POLYETHYLENE OXIDE FOR ENHANCED WATER RETENTION

This application is a National Stage Application under 35 U.S.C. § 371 of International Application Number PCT/US2016/038975, filed Jun. 23, 2016 and published as WO 2016/210100 on Dec. 29, 2016, which claims the benefit to U.S. Provisional Application 62/185,217, filed Jun. 26, 2015, the entire contents of which are incorporated herein by reference in its entirety.

BACKGROUND OF THE INVENTION

Field of the Invention

The present invention relates to a method for treating an aggregation of particulates, such as soil, with two different aqueous mixtures in order to increase water holding capacity of the aggregation of particulates. One aqueous mixture contains a sulfonated aromatic polymer component and the other aqueous mixture contains polyethylene oxide.

Introduction

Farming in arid and semi-arid climates is challenging because it is difficult to retain water in soil. Global population growth and growing demands for crops in developing countries, in combination with increasing frequency of drought conditions in arid and semi-arid areas, provide a need for increasing water use efficiency in agricultural production. Increasing water holding capacity (WHC) and retaining available water capacity of soil in a plant root zone will benefit crop yield. Additionally, increasing WHC will help reduce fertilizer leaching into the environment and increase fertilizer efficiency.

Incorporating hydrogel or superabsorbent polymer (SAP) materials as soil additives is one way to increase WHC in soil. SAP soil additives have been used in horticulture, pot mix, gardening and some high value crop applications. However, a challenge with hydrogel and SAP materials is that they are challenging to deliver into a field. To introduce these materials to root level of a field, they need to be delivered in particulate form and mechanically worked into the field, but that adds an additional level of complexity to preparing a field. Alternatively, hydrogel or SAP materials can be coated directly onto seeds or agricultural enhancement agents (such as pesticides, and fertilizer). Coating seeds and agricultural enhancement agents with hydrogel or SAP materials adds expense and complexity to the agricultural process as well.

It is desirable to identify a way to efficiently increase the WHC of the soil in a way that is readily field deliverable without adding significant complexity or added expense to current materials. It is particularly desirable to be able to deliver WHC-increasing additives to the soil of a field as an aqueous mixture so that it can be readily incorporated into an irrigation system or current aqueous mixture delivery method. Even more desirable is to identify a way to deliver WHC-increasing additives to the soil of a field as an aqueous mixture in combination with agricultural enhancement agents such as fertilizer.

BRIEF SUMMARY OF THE INVENTION

The present invention provides a method to efficiently increase the WHC of an aggregation of particulates, such as soil, in a way that is readily field deliverable without adding significant complexity or added expense to current agricultural materials and agriculture processes. The present invention provides a method that delivers WHC-increasing additives to an aggregation of particulates, such as the soil of a field, in the form of an aqueous mixture so that it can be readily incorporated into an aqueous mixture delivery method such as a current irrigation or fertilization system. The method of the present invention can even include delivering WHC-increasing additives to an aggregation of particulates, such as the soil of a field, as an aqueous mixture in combination with agricultural enhancement agents such as fertilizer.

Surprisingly, it has been discovered that treating an aggregation of particulates, such as soil, sequentially with an aqueous mixture containing a sulfonated aromatic polymer component and then with a separate aqueous mixture containing a polyethylene oxide material results in an increased WHC of the aggregation of particulates, even beyond that achieved by treating the aggregation of particulates with either of the aqueous mixtures alone. Even more surprisingly, is that this synergistic effect does not occur when treating the aggregation of particulates with the same aqueous mixtures in the reverse order (that is, first with the polyethylene oxide mixture and then the mixture containing a sulfonated aromatic polymer component).

In a first aspect, the present invention is a method comprising treating a aggregation of particulates with two different aqueous mixtures, first with an aqueous mixture containing a sulfonated aromatic polymer component and then with an aqueous mixture containing polyethylene oxide.

The present invention has utility as, for example, a method for increasing the water holding capacity of soil for farming.

DETAILED DESCRIPTION OF THE INVENTION

"And/or" means "and, or alternatively". "Multiple" means two or more. All ranges include endpoints unless otherwise stated. "Molecular weight" refers to weight-average molecular weight as determined by size exclusion chromatography unless otherwise stated.

Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

The present invention is a method that is useful for treating an aggregation of particulates. An aggregation of particulates is a substance comprising multiple particulates, or particles. For example, sand is an aggregation of particulates that comprises multiple silicon dioxide particulates. It is desirable for the aggregation of particulates to comprise organic material, preferably organic particulates. Soil is an aggregation of particulates comprising multiple organic and inorganic particulates and in which organisms and/or plant life can grow. There are many different types of soil. The present invention is particularly useful for treating soil of any type.

The method of the present invention is useful for increasing the water holding capacity (WHC) of the aggregation of particulates that is treated in the method. WHC is a measure of water retention by the aggregation of particulates. Determine WHC for an aggregation of particulates using the Water Holding Capacity (WHC) Measurement Method set forth in the Examples section below.

The method of the present invention requires treating an aggregation of particulates with two separate aqueous mixtures. "Aqueous mixture" refers to a combination of components one of which is water. Non-water components in an aqueous mixture are desirably, though not necessarily, water soluble. A component is "water soluble" if at least 0.01 grams of the component dissolves into 100 milliliters of water at 23° C. so as to form an aqueous solution. An aqueous solution is a uniform distribution of one or more than one component in water. Determine whether a component is uniformly distributed as evidenced by an absence of sedimentation or phase separation upon visual inspection of the mixture 30 minutes after mixing the components of the mixture together. One or both of the aqueous mixtures are desirably aqueous solutions to facilitate application of the aqueous mixtures without risk of clogging application equipment.

The first aqueous mixture is an aqueous mixture containing a sulfonated aromatic polymer component. Desirably, the sulfonated aromatic polymer component is water soluble. Examples of suitable sulfonated aromatic polymer components include one or any combination of more than one selected from a group consisting of sulfonated naphthalene formaldehyde polycondensate, sulfonated phenol formaldehyde polycondensate, polystyrene sulfonate, ortho and para toluenesulfonamide formaldehyde polymers, and lignosulfonate. The aromatic ring of the sulfonated aromatic polymer component can include one or more than one alkyl or alkylene group with one to 18 carbon atoms.

The sulfonated aromatic polymer component is preferably a polymer having a molecular weight greater than 700 grams per mole/(g/mole), preferably 900 g/mol or greater, more preferably 1000 g/mole or greater and can be 1100 g/mol or greater, 1500 g/mol or greater, 2000 g/mole or greater, 5,000 g/mol or greater, 10,000 g/mol or greater, 25,000 g/mol or greater, 50,000 g/mol or greater and even 100,000 g/mol or greater while at the same time there is no known upper limit on molecular weight, but typically have a molecular weight of five million g/mol or less, more typically one million or less and can be 750,000 g/mol or less, 500,000 g/mol or less, 250,000 g/mol or less, 100,000 g/mol or less, even 70,000 g/mol or less, 50,000 g/mol or less, 10,000 g/mol or less, 5,000 g/mol or less or 1,250 g/mol or less. One of ordinary skill can adjust the water solubility of a sulfonated aromatic polymer component by modifying the extent of sulfonation—increasing sulfonation increases water solubility. Typically, the average extent of sulfonation is desirably 50 mole-percent (mol %) or more, preferably 90 mol % or more and at the same time is generally 100 mol % or less based on total moles of aromatic groups.

The aqueous mixture containing sulfonated aromatic polymer component can be a concentrate that is diluted prior to application to an aggregation of particulates or it can be an aqueous mixture ready for application to an aggregation of particulates. If a concentrate, the aqueous mixture can contain 0.1 weight-percent (wt %) or more, preferably 0.5 wt % or more, more preferably one wt % or more, yet more preferably five wt % or more and can contain 10 wt % or more, 20 wt % or more, 30 wt % or more and even 40 wt % or more while at the same time contains 50 wt % or less sulfonated aromatic polymer components based on total weight of the aqueous mixture containing the sulfonated aromatic polymer components. When the aqueous mixture containing sulfonated aromatic polymer component is applied to an aggregation of particulates, the concentrate of sulfonated aromatic polymer components is desirably one weight part per million (ppm) or more, preferably 10 ppm or more, more preferably 50 ppm or more and can be 100 ppm or more, 500 ppm or more, 1000 ppm or more and even 5000 ppm or more while at the same time is typically 10,000 ppm or less based on total weight of aqueous mixture containing the sulfonated aromatic polymer component.

Desirably, provide the aqueous mixture of sulfonated aromatic polymer component by mixing together sulfonate aromatic component and water. Typically, the sulfonated aromatic polymer component is unassociated with any other component, such as agricultural enhancement agents, when mixed into water. "Unassociated" with other components means unbound, unattached, and distinct from any other component that might be mixed into the water to form an aqueous mixture. For example, if the aqueous mixture contains both sulfonated aromatic polymer component and fertilizer the sulfonated aromatic polymer component is unassociated with the fertilizer if the two are added separately to water as opposed to, for example, adding to water a fertilizer coated with a sulfonated aromatic polymer component. Similarly, in the aqueous mixture containing sulfonated aromatic polymer component the majority (greater than 50 wt %) of the sulfonated aromatic polymer component is unbound and unattached to other components that may be in the aqueous mixture.

The second aqueous mixture is an aqueous mixture containing polyethylene oxide. The polyethylene oxide can be a homopolymer of ethylene oxide, a copolymer of ethylene oxide with other alkylene oxides, or a combination of ethylene oxide homopolymer and copolymer of ethylene oxide with other alkylene oxides.

The copolymer of ethylene oxide can be a random copolymer, block copolymer or a combination of random and block copolymers. Suitable alkylene oxides that can be copolymerized with ethylene oxide to form the ethylene oxide copolymer include propylene oxide and butylene oxide. Desirably, the ethylene oxide copolymer contains 10 wt % or more, preferably 20 wt % or more copolymerized ethylene oxide based on total weight of copolymerized alkylene oxide.

The polyethylene oxide is typically initiated with a material having one or more than one hydroxyl (—OH) and/or carboxyl (—COOH) group, and can be initiated with a material having one or more amine (—NH$_2$) group and/or thio (—SH) group. Often the initiator is selected from monol, diol and triols having from one to 18 carbon atoms. Monols have a single hydroxyl group. Diols have two hydroxyl groups. Triols have three hydroxyl groups. Examples of desirable monol initiators include 1-dodecanol, butanol, 2-ethylhexanol, n-octanol, decanol, and oleyl alcohol. Examples of suitable diols include ethylene glycol, diethylene glycol, 1,2-propylene glycol, 1,3-propylene glycol, and 1,4-butanediol. Examples of suitable triols include glycerol and trimethylolpropane.

The polyethylene oxide can be hydroxyl terminated or be partially or fully capped with a capping group selected from a group consisting of alkyl or alkenyl having one to 18 carbons, benzyl, halide or C(O)R where R is an alkyl having one to ten carbons. "Partially capped" means less than all of the terminal hydroxyl groups are capped.

The polyethylene oxide desirably has a molecular weight of 200 g/mol or more, preferably 500 g/mol or more, more preferably 1,000 g/mol or more and can be 10,000 g/mol or more, 50,000 g/mol or more, 100,000 g/mol or more, 200,000 g/mol or more 500,000 g/mol or more, 1,000,000 g/mol or more and even 5,000,000 g/mol or more while at the same time is generally 10,000,000 g/mol or less.

Desirably the polyethylene oxide is water soluble. That means it is desirable to select molecular weight, cap compositions and copolymer ratios such that the resulting polyethylene oxide is water soluble. The aqueous mixture containing polyethylene oxide is preferably free of polyethylene oxide that is not water soluble.

The sulfonated aromatic polymer component and the polyethylene oxide, when present in the same aqueous mixture, tend to interact to form a gel or solution that is sufficiently viscous so as to be difficult to apply to an aggregation of particulates such as a soil, especially in a field. Therefore, it is desirable for the aqueous mixture containing the sulfonated aromatic polymer component to be free of polyethylene oxide. Similarly, it is desirable for the aqueous mixture containing the polyethylene oxide to be free of sulfonated aromatic polymer component. Likewise, the aqueous mixture of sulfonated aromatic polymer component and the aqueous solution of polyethylene oxide is desirably kept separate from one another until during or after application of the mixtures to an aggregation of particulates in order to avoid gelling prior to application, which is what is meant by applying these mixtures as "two different" aqueous mixtures.

Treat the aggregation of particulates with the two different aqueous mixtures by first treating with the aqueous solution containing sulfonated aromatic polymer component and then treating with the aqueous solution containing polyethylene oxide. It has surprisingly been discovered that especially high WHC values are achieved in an aggregation of particulates when the aqueous mixture of sulfonated aromatic polymer component is first applied to the aggregation of particulates and then the aqueous mixture of polyethylene oxide is applied to the aggregation of particulates. When the aggregation of particulates are treated with the aqueous mixtures in this order there appears to be a synergistic affect between the sulfonated aromatic polymer component and polyethylene oxide that increases WHC over WHC values achieved with either aqueous mixture alone and that does not occur when the aqueous mixtures are applied in the reverse order.

The relative ratio of sulfonated aromatic polymer component and polyethylene oxide that is applied to the aggregation of particulates is not critical in the broadest scope of the invention. Typically, the weight ratio of sulfonated aromatic polymer component to polyethylene oxide applied to the aggregation of particulates is 10:1 or less more and can be 1:1 or less and at the same time is generally 1:10 or more and can be 1:1 or more (the ratio is "more" when the first number increases relative to the second number).

Surprisingly, the combination of sulfonated aromatic polymer component and polyethylene oxide in the aggregation of particulates can result in greater WHC for the aggregation of particulates than if only one of the sulfonated aromatic polymer component or polyethylene oxide was applied to the aggregation of particulates. Without being bound by theory, the combination of sulfonated aromatic polymer component and polyethylene oxide may undergo an interaction known as the CH-$\pi$ interaction where the alkyl protons of the polyethylene oxide are attracted to the $\pi$-electrons of the aromatic rings in the sulfonated aromatic polymer component. Such an interaction could induce supramolecular structure between the sulfonated aromatic polymer components and polyethylene oxide molecules that helps retain water. Such a structure would also account for the gel formation if the sulfonated aromatic polymer component and polyethylene oxide are combined into a single aqueous mixture.

Even more surprising is that the WHC enhancement is achieved by the combination of sulfonated aromatic polymer and polyethylene oxide requires first applying the sulfonated aromatic polymer component to the aggregation of particles and then applying the polyethylene oxide. The enhancement is not realized if the application of the two components is done in the reverse order. Without being bound by theory, one hypothesis is that interaction with the aggregate particles inhibits the polyethylene oxide from achieving CH-$\pi$ interactions with the sulfonated aromatic components if the polyethylene oxide is applied to the aggregate particles first.

One or both of the aqueous mixture containing a sulfonated aromatic polymer component and the aqueous mixture containing polyethylene oxide can further contain other components besides water and either polyethylene oxide or sulfonated aromatic polymer components. Desirably, the other components are water soluble. Examples of suitable other components include anionic surfactants (such as aklylbenzene sulfonate, alkyl sulfate, alkylether sulfate, alkyldiphenylether sulfonate), nonionic surfactants (such as alkylphenol ethoxylate, linear and branched alcohol ethoxylate or alkoxylate, alkylamine ethoxylate or alkoxylate, alkyllpolygulcoside), soil erosion inhibitors (such as water soluble linear polyacrylamides), wetting agents, and fertilizers (such as such as fertilizers containing ammonium nitrate and/or one or more than one element selected from nitrogen, phosphorous and potassium, sulfur, zinc, iron, copper, boron, manganese, chlorine and molybdenum; preferred is a urea-containing fertilizer including urea-containing fertilizers that contain one or more than one element selected from phosphorous, potassium, sulfur, zinc, iron, copper, boron, manganese, chlorine and molybdenum as well as ammonium nitrate fertilizer).

It is desirable that the aqueous mixtures be free of alachlor and reaction products of alachlor. Alachlor and its reaction products are useful as herbicides and one desirable application of the present invention is to increase WHC of soil for agricultural uses such as farming. Especially in such uses alachlor and its reaction products can be undesirable.

The method of the present invention is particularly well suited for agricultural applications where the aggregation of particulates is soil in a field. Agricultural processes (for example, fertilization and irrigation) already employ methods requiring application of aqueous solutions to fields and such processes can readily be adapted to incorporate the method of the present invention. For example, sulfonated aromatic polymer components and polyethylene oxide can be readily introduced into irrigation lines so as to enhance WHC of soil during irrigation. As another example, an existing method for applying an aqueous solution of fertilizer can be modified to an application of two aqueous mixtures as described in the present invention wherein at least one of the aqueous mixtures further comprises fertilizer. Such a modified process serves to both fertilizer and increase WHC of the soil in a single process that is essentially the same as the process of solely adding fertilizer.

Examples

The following examples serve to illustrate embodiments of the invention rather than define the broadest scope of the invention.

Water Holding Capacity (WHC) Measurement Method

The procedure for measuring WHC of an aggregation of particulates ("Sample") such as soil is a follows:

(1) Provide a polyvinylchloride (PVC) drain, waste and vent (DWV) coupling having a 6.35 centimeter (cm) inner diameter and a 5.74 cm height. Determine the weight of a piece of filter paper (Schleicher & Schuell No. 0980) and record as "Filter Paper Weight". Cover one end of the coupling with the piece of filter paper (and affix the filter paper to the coupling with a rubber band so that a flat smooth filter paper surface is achieved over one end (bottom) of the coupling.

(2) Weigh and record the weight (W1) of the coupling with rubber band and filter paper.

(3) Place the coupling in a 100×50 millimeter (mm) crystallization dish with the filter paper-covered side on the bottom against the dish. Into the coupling place 50.00 grams of the Sample. Smooth the surface of the Sample with a spatula.

(4) Slowly apply 100 milliliters (ml) of aqueous fluid (for example, water or one or more than one aqueous mixture) evenly over the Sample using a dropper. Control the addition rate so as to avoid disturbing the integrity of the Sample surface and to avoid overflow of accumulated aqueous fluid over the top of the coupling.

(5) Allow the aqueous fluid to run through the soil. The water level in the crystallization dish reaches approximately half the height of the Sample height in the coupling. Cover the open portion of the crystallization dish with plastic to prevent water evaporation from the dish. Allow the coupling with the Sample to sit in the dish for 22-26 hours to allow the Sample to saturate with aqueous fluid before proceeding.

(6) Place a 12×12 cm glass plate on top of an electronic balance (1000 gram capacity with 0.001 g resolution). Onto the glass plate stack 6 pieces of Grade 2294 Filter paper (110 millimeter diameter from GE Healthcare Lifescience) while making sure the pieces of filter paper are flat and free of void space between them.

(7) Remove the coupling with saturated Sample from the dish and place centrally on top of the Grade 2294 Filter Paper pieces with the filter paper of the coupling assembly against the Grade 2294 Filter Paper pieces. The Grade 2294 Filter Paper pieces will slowly wick way aqueous fluid from the filter paper of the coupling assembly and Sample. Allow to set for 30 minutes, after which carefully remove the coupling with the filter paper and Sample and then record the weight reading of the balance (R1). Replace the coupling with the Sample on the Grade 2294 Filter Paper pieces and allow to set for 10 minutes. Again, carefully remove the coupling with the filter paper, rubber band and Sample and again record the weight reading on the balance (Reading 2). If R2 is the same (within 0.05 grams) or less than R1 then equilibrium has been achieved and you can proceed to step (8), otherwise replace the coupling on the Grade 2294 Filter Paper pieces for another 10 minutes, remove and weight. Repeat as necessary until two subsequent weight reading are within 0.05 grams of one another or the second is lower than the first.

(8) Immediately measure the weight of the coupling, rubber band, filter paper and Sample after completing Step (7) to 0.001 gram and record the weight as W2.

(9) Observe the Grade 2294 Filter Paper pieces. If the bottom Grade 2294 Filter Paper (that is, the one adjacent to the glass plate) is wet through then stop the method. The method must be repeated with more pieces of Grade 2294 Filter Paper in the stack.

(10) Remove the rubber band from the coupling and transfer the Sample to a tared glass beaker. Use the filter paper to remove any Sample residue left in the coupling and transfer the Sample residue into the glass beaker. Add the filter paper to the glass beaker. Place the beaker containing the filter paper and Sample in a conventional oven at 105 degrees Celsius (° C.) for at least 10 hours (overnight).

(11) Allow the beaker containing the filter paper and Sample to set at 21° C. and 50% relative humidity for two hours. Measure the combined weight of the beaker, Sample and filter paper and subtract from that the weight of the filter paper and beaker to obtain the weight of the dried Sample (W3).

(12) Calculate WHC as a weight-percent of water relative to dried Sample according to the following formula:

$$WHC = 100 * (W2 - W1 - W3) / W3$$

Materials Used in Examples

Table 1 lists components for Examples (Exs) and Comparative Examples (Comp Exs).

TABLE 1

| Name | Component | Description |
|---|---|---|
| WSR 301 | Polyethylene oxide | Water soluble polyethylene oxide homopolymer having a molecular weight of approximately 4,000,000 grams per mole. Commercially available under the tradename POLYOX ™ WSR301 (POLYOX is a trademark of The Dow chemical Company) |
| PEG 8000 | Polyethylene oxide | Water soluble polyethylene oxide homopolymer having a molecular weight of approximately 8,000 grams per mole. Commercially available under the tradename CARBOWAX ™ PEG 8000 (CARBOWAX is a trademark of The Dow Chemical Company) |
| SNFP | Sulfonated aromatic component | Water soluble neutral sodium salt of a sulfonated naphthalene formaldehyde polycondensate having a molecular weight of approximately 1100 g/mol. The SNFP is commercially available as OROTAN ™ SN naphthalene condensate. (OROTAN is a trademark of Rohm and Haas Company). |
| Soil | Aggregation of particulates | Sandy loam soil commercially available as AGVISE Soil M-SL-PF from Agvise Laboratories and sourced from North Dakota, sieved to pass 2 millimeters and composed of 63 wt % sands, 18 wt % silts and 19 wt % clays with wt % based on total Soil weight. |

Comparative Example A—WHC Using Water

Determine the WHC of Soil using the Water Holding Capacity (WHC) Measurement Method using [100 milliliters deionized water as the "aqueous fluid" in the method. Repeat the procedure five times using fresh Soil samples. The average WHC of the five measurements is 27.8%.

Comparative Examples B and C—WHC Using Aqueous Solution Containing Sulfonated Aromatic Polymer Component Determine the WHC of Soil using the Water Holding Capacity (WHC) Measurement Method using 100 milliliters of an aqueous solution containing SNFP as the "aqueous fluid" in the method. For Comp Ex B use an aqueous solution containing 1000 ppm SNFP. For Comp Ex C use and aqueous solution containing 2000 ppm SNFP. Measure ppm relative to total weight of the aqueous solution. Repeat the method two times for each Comp Ex and take the average value as the WHC for that Comp Ex.

Comp Ex B (1000 ppm) has a WHC of 31.2%. Comp C (2000 ppm) has a WHC of 29.7%. Both of these WHC values are higher than achieved with deionized water, indicating that SNFP is a WHC-enhancing additive.

Comparative Examples D and E—WHC Using Aqueous Solution Containing Polyethylene Oxide Determine the WHC of Soil using the Water Holding Capacity (WHC) Measurement Method using 100 milliliters of an aqueous solution containing polyethylene oxide as the "aqueous fluid" in the method. For Comp Ex D use an aqueous solution containing 1000 ppm PEG 8000. For Comp Ex E use an aqueous solution containing 1000 ppm WSR 301. Measure ppm relative to total weight of the aqueous solution. Repeat the method two times for each Comp Ex and take the average value as the WHC for that Comp Ex.

Comp Ex D (PEG 8000) has a WHC of 27.7%. Comp E (WSR 301) has a WHC of 27.2%. Both of these WHC values are lower than achieved with deionized water, indicating that polyethylene oxide alone is not a WHC-enhancing additive.

Comparative Examples F and G—WHC Using Sequential Treatments of Aqueous Solutions Containing Polyethylene Oxide and then Sulfonated Aromatic Polymer Component Determine the WHC of Soil using the Water Holding Capacity (WHC) Measurement Method by first applying 50 milliliters of an aqueous solution containing 1000 ppm polyethylene oxide and then immediately applying 50 milliliters of an aqueous solution containing 3000 ppm SNFP. For Comparative Example F use PEG 8000 as the polyethylene oxide and take the average of two determinations to calculate WHC. For Comparative Example G use WSR 301 as the polyethylene oxide and take the average of four determinations to calculate WHC.

Notably, the total SNFP applied in these determinations is equivalent to 100 milliliters of 1500 ppm SNFP so if the SNFP and polyethylene glycol did not act synergistically one would expect an WHC in between the values for Comp Ex A (31.2%) and Comp Ex B (29.7%).

Comparative Example F has a WHC of 27.8% and Comparative Example G has a WHC of 30.1%. These values are either between or slightly lower than the WHC values expected for an equivalent amount of SNFP alone and suggest a lack of synergy between the SNFP and polyethylene oxide when treating Soil first with an aqueous polyethylene oxide mixture and then with an aqueous sulfonated aromatic polymer component mixture.

Examples 1 and 2—WHC Using Sequential Treatments of Aqueous Solutions Containing Sulfonated Aromatic Polymer Component and then Polyethylene Oxide Determine the WHC of Soil using the Water Holding Capacity (WHC) Measurement Method by first applying 50 milliliters of an aqueous solution containing 3000 ppm SNFP and then immediately applying 50 milliliters of an aqueous solution containing 1000 ppm polyethylene oxide. For Example 1 use PEG 8000 as the polyethylene oxide and take the average of two determinations to calculate WHC. For Example 2 use WSR 301 as the polyethylene oxide and take the average of four determinations to calculate WHC.

Notably, the total SNFP applied is equivalent to 100 milliliters of 1500 ppm SNFP so if the SNFP and polyethylene glycol did not act synergistically one would expect an WHC in between the values for Comp Ex A (31.2%) and Comp Ex B (29.7%).

Example 1 has a WHC of 33.6% and Example 2 has a WHC of 40.8%—both of which are significantly higher than the WHC values for aqueous solutions of either the sulfonated aromatic polymer component or polyethylene oxide components alone. The result reveals a synergistic improvement in WHC upon sequential treatment of Soil first with an aqueous solution containing a sulfonated aromatic polymer component and subsequently with an aqueous solution containing a polyethylene oxide.

What is claimed is:

1. A method for increasing a water holding capacity of aggregation particles comprising:
    applying a first aqueous mixture containing a sulfonated aromatic polymer component to the aggregation particles, wherein the sulfonated aromatic polymer component is unassociated with other components; and
    applying a second aqueous mixture containing polyethylene oxide to the aggregation particles,
        wherein the second aqueous mixture is applied to the aggregation particles after the first aqueous mixture is applied to the aggregation particles, wherein the first aqueous mixture is free of polyethylene oxide and the second aqueous mixture is free of the sulfonated aromatic polymer component, and wherein one of the aqueous mixtures comprises a fertilizer.

2. The method of claim 1, wherein the sulfonated aromatic polymer component is selected from a group consisting of sulfonated naphthalene formaldehyde polycondensate, sulfonated phenol formaldehyde polycondensate, polystyrene sulfonate, ortho and para toluenesulfonamide formaldehyde polymers, and lignosulfonate.

3. The method of claim 2, wherein the sulfonated aromatic polymer component is sulfonated naphthalene formaldehyde polycondensate.

4. The method of claim 1, wherein the first aqueous mixture is made from a concentrated sulfonated aromatic polymer component and the second aqueous mixture is made from a concentrated polyethylene oxide.

5. The method of claim 4, wherein the concentrated sulfonated aromatic polymer component in the first aqueous mixture is 0.1 weight parts or more and 10,000 weight parts or less based on one million weight parts of the first aqueous mixture.

6. The method of claim 4, wherein the concentrated polyethylene oxide in the second aqueous mixture is 0.1 weight parts or more and 10,000 weight parts or less based on one million weight parts of the second aqueous mixture.

7. The method of claim 1, wherein the polyethylene oxide has a molecular weight of 200 grams per mole or greater and 10,000,000 grams per mole or less as determined by size exclusion chromatography.

8. The method of claim 1, wherein both the sulfonated aromatic polymer component and polyethylene oxide are water soluble.

9. The method of claim 1, wherein the first aqueous mixture and the second aqueous mixture comprises a fertilizer.

* * * * *